May 31, 1960 B. R. McGRAW ET AL 2,938,459
CROSS-BEARING GIMBAL

Filed May 11, 1956 3 Sheets-Sheet 1

INVENTORS.
BERNARD R. MC GRAW
JAMES E. ROBERTSON
BY
*William L Henn*
ATTORNEY

May 31, 1960     B. R. McGRAW ET AL     2,938,459
CROSS-BEARING GIMBAL

Filed May 11, 1956     3 Sheets-Sheet 2

INVENTORS.
BERNARD R. MC GRAW
JAMES E. ROBERTSON
BY

ATTORNEY

May 31, 1960  B. R. McGRAW ET AL  2,938,459
CROSS-BEARING GIMBAL

Filed May 11, 1956  3 Sheets-Sheet 3

INVENTORS.
BERNARD R. MC GRAW
JAMES E. ROBERTSON
BY
ATTORNEY

United States Patent Office 2,938,459
Patented May 31, 1960

2,938,459

CROSS-BEARING GIMBAL

Bernard R. McGraw, Arcadia, and James E. Robertson, Rivera, Calif., assignors to North American Aviation, Inc.

Filed May 11, 1956, Ser. No. 586,343

9 Claims. (Cl. 102—49)

This invention relates to a gimbal bearing or universal type bearing for carrying a thrust load between two members.

More specifically, this gimbal bearing was conceived for use in guided missiles as a means to permit the universal movement of rocket engines therein and, at the same time during flight, to receive their thrust. One of the problems in the construction of a rocket powered guided missile is to provide the means to effect the guidance required for maintaining proper direction and for changing the direction of flight. Jet vanes have been used in the path of the rocket blast to deflect it to change the direction of the missile, but they have been unsatisfactory because no practical material has been found which will stand the heat of the rocket blast. Other types of gimbals have been considered but have been generally found to add too much weight to the already heavy missile.

The cross-bearing gimbal provided in the present invention is essentially a universal joint, capable of employing universal motion while transmitting very high thrust loads, and resisting substantial end loads and twisting moments. The cross bearing can be pictured as a cylinder which has been halved by a plane containing the axis of the cylinder and of which one of the halves has been rotated 90° to the other about the longitudinal center of the cylinder. This provides two convex semicylindrical bearing surfaces with their longitudinal axes at 90° to each other. The bearing housing is made up of two pillow blocks, each having a concave semicylindrical bearing surface for mating with one of the convex bearing surfaces. Adapters or retainers are used to hold the three pieces together. One of the pillow blocks is secured to a mount above the rocket engine in the missile structure; the other pillow block is secured directly to the top of the rocket engine.

The present invention differs from other types of gimbals and universal joints in a number of ways. For example, only two half-bearing surfaces, normal to the thrust, are required; whereas, other types of joints and gimbals usually have four full-bearing surfaces. Using only two half-bearing surfaces requires less weight and material and occupies less space than other types of gimbals and bearings. This is a major factor in aircraft and missile design.

Another distinct innovation in the present invention is that the thrust vector, produced in one of the two connected members, such as a rocket engine and missile, acts directly through the bearing surfaces; bearing surfaces of other gimbals necessarily are located radially outward from the thrust vector, as in the typical gimbal ring. This improvement provides better performance than other types of gimbals because of the better load distribution which minimizes deflections and misalignment problems caused by bending moments which often occur with full bearings located at some distance from the thrust vector. It also makes possible a much lighter construction, saving up to 300 pounds in the bearings and their mounts as used in large rocket engines. Thus, the cross-bearing gimbal is readily adaptable for transmitting high thrust and to changing of the direction of the thrust vector at the same time. This feature is especially important in installations, such as missiles, because the guidance can be accomplished by just changing the direction of the engine thrust. Consequently, special guide vanes are no longer required, and steering in outer space, where surface controls on the missile do not function, can be effected.

A further difference is in the bearing motion. The present bearing surfaces function with a sliding motion, i.e., translational motion in which all of the points of the moving body have at any instant the same velocity and direction of motion; in contrast to or as distinct from rotation. A bearing which operates with sliding motion rather than with rotation can be made much smaller to carry any certain load than can a rotational and antifriction bearing. A sliding bearing, such as the cross-gimbal bearing, is easy to lubricate and to keep lubricated. The bearing surfaces are coated with a molybdenum disulfide dry film lubricant, and a general purpose aircraft grease is inserted between the surfaces with a grease gun. The dry film coating provides a lubricating surface which is tough and durable and the grease is used to minimize frictional torque. These lubricants are generally unsuitable for antifriction bearings. The bearing surface may be of a material which does not need protection from corrosion; but if it does, the film coating will provide it. High strength antifriction bearings depend solely on protection against corrosion afforded by oils and greases. A cross bearing may be made with a variety of materials, such as chromium plated steel, or even wood, the choice of the material depending upon the thrust load. High strength antifriction bearings can be made only of a few materials. If there is a lubrication failure in the cross-bearing gimbal, it will function successfully for a prolonged operation; whereas, a lubrication failure in antifriction bearings, as used in other gimbals, is catastrophic.

It is therefore an object of this invention to provide a new gimbal bearing.

It is a principal object of this invention to provide a cross-bearing gimbal in which the thrust vector can act directly through the bearing surfaces.

It is another object of this invention to provide a cross-bearing gimbal which incorporates translational motion.

It is still another object of this invention to provide a gimbal bearing which is capable of universal movement while transmitting very high thrust loads.

It is a further object of this invention to provide a gimbal bearing which has a low weight and which occupies very little space.

It is a still further object of this invention to provide a gimbal bearing which is comprised of a bearing block, having on opposite sides thereof, convex semicylindrical bearing surfaces whose longitudinal axes are at 90° to each other.

It is an object of this inveniton to provide a gimbal bearing for use in a guided missile to allow the universal tilting of rocket engines therein to change the direction of the missile.

Other objects of invention will become apparent from the following description taken in connection with the accompanying drawings, in which.

Figure 1:
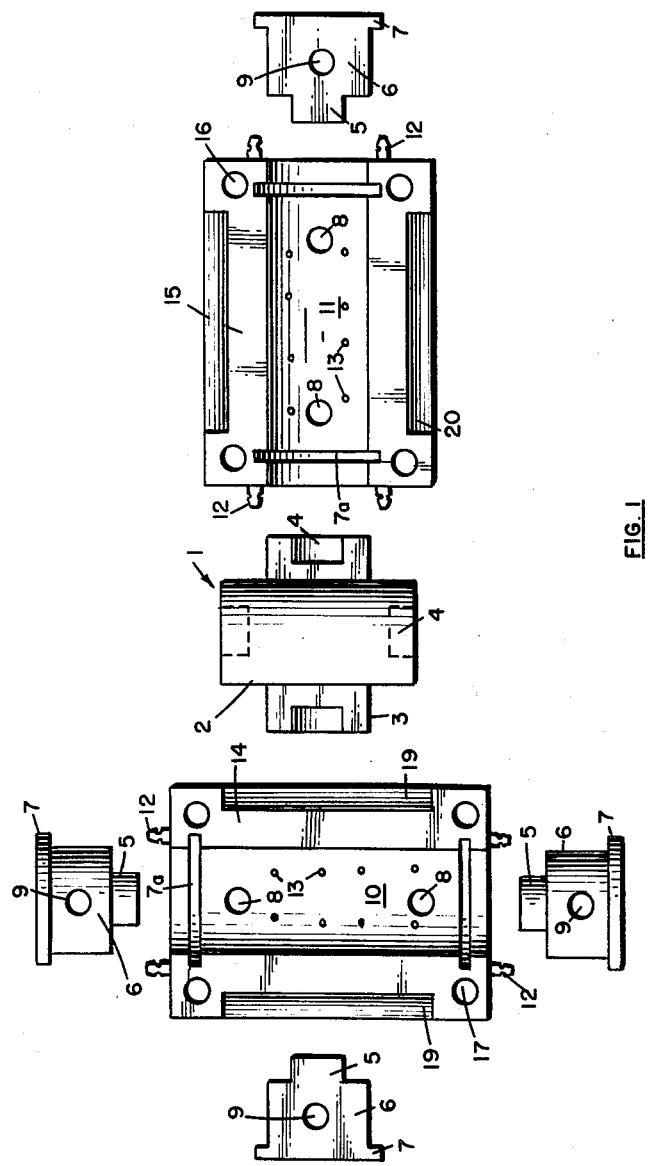
Fig. 1 is an exploded view of one embodiment of the cross-bearing gimbal.
Figure 2:
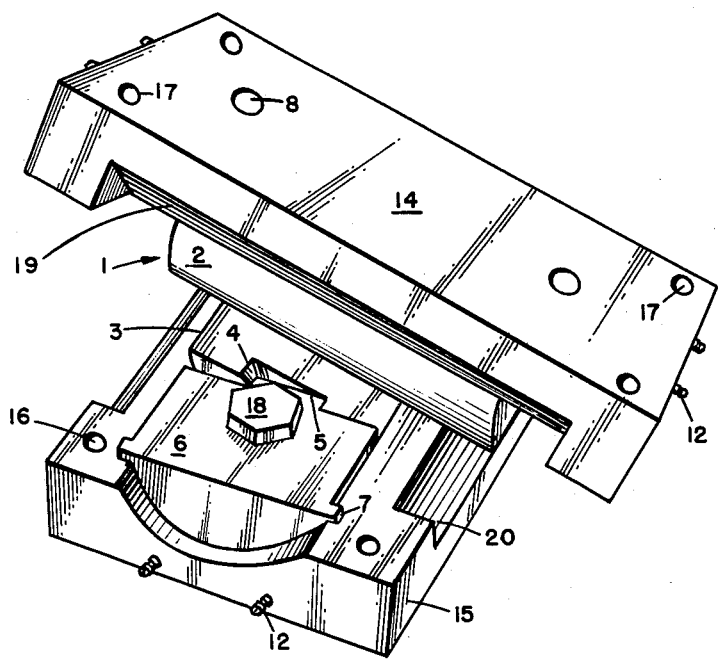
Fig. 2 is an assembly view of the parts shown in Fig. 1.

Referring to Figs. 1 and 2, cross bearing block 1 has two convex semicylindrical bearing surfaces 2 and 3 on opposite sides, said surfaces having longitudinal axes at 90° to each other. Block 1 can be made of two half cylinders or can be made of one piece. Internally of each end of each bearing surface is a semicylindrical pin bearing surface 4 against which semicylindrical pins 5 are fitted for holding the block 1 in pillow blocks 14 and 15. Bearing block 1 is fitted into mount pillow block 14 so that bearing surface 2 is in contact with concave bearing surface 10, and block 1 fits into rocket engine pillow block 15 so that bearing surface 3 is in contact with concave bearing surface 11. Pins 5 are extensions on pin retainers 6, which are secured to the pillow blocks by bolts 18 through holes 8 and 9 when retainers 6 are placed in the pillow blocks to hold the cross bearing in assembly. Flanges 7 on retainers 6 are on the opposite end from said pins and fit into grooves 7a in the pillow blocks. Flanges 7 act to resist longitudinal movement along the axes of the pillow blocks and form a seal against grease seepage around retainers 6.

Grease can be inserted between the convex and concave bearing surfaces through lubrication fittings 12, which are open to holes 13 in the respective concave surfaces. Bevel surfaces 19 and 20 or other cutaway areas on blocks 14 and 15, respectively, permit a greater angle of tilting than would be possible with plain surfaces.

Figure 3:
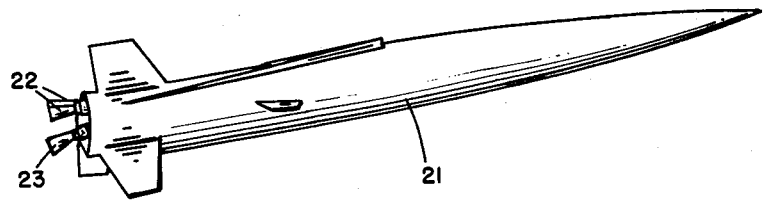
Fig. 3 is a view of a rocket powered guided missile having one of its rocket engines tilted for the purpose of changing the direction of the missile.
Figure 4:
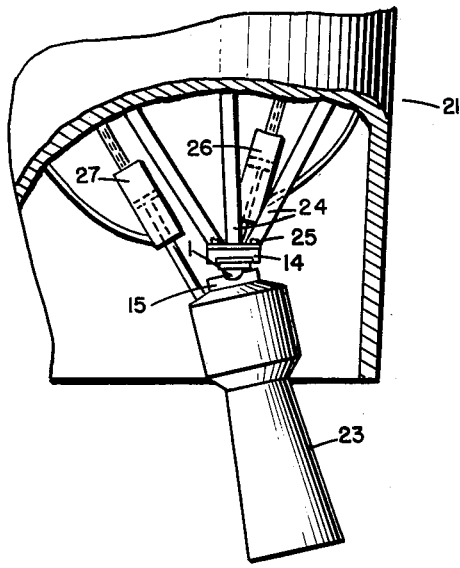
Fig. 4 is a cutaway view of the guided missile of Fig. 3 showing the rocket engine and the structure for tilting the rocket engine.

Referring to Figs. 3 and 4, mount pillow block 14 is secured to mount plate 25 by bolts through holes 17, and engine pillow block 15 is secured to the top of engine 23 by bolts through holes 16. Mount supports 24 are welded to mount plate 25 in missile 21. Guided missile 21 is shown in Fig. 3, with fixed rocket engines 22 and universally mounted rocket engine 23, which is shown in a tilted position. Rocket engine 23, being mounted for universal tilting on bearing block 1, is tilted by means of hydraulically operated actuators 26 and 27 on axes at right angles to each other. The axes of actuators 26 and 27 are fixed so that rocket engine 23 can be universally tilted on bearing surfaces 2 and 3.

Figure 5:
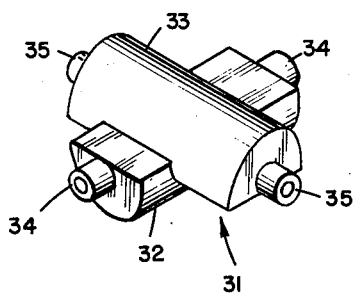
Fig. 5 is another embodiment of the present invention.

In Fig. 5 is shown another embodiment of the invention in which bearing block 31 has two overlapping convex semicylindrical bearing surfaces 32 and 33 on opposite sides. The longitudinal axes of the bearing surfaces are at 90° to each other. This embodiment has pins 34 and 35 on which semicylindrical bearing surfaces 32 and 33, respectively, rotate and are held in place. This type of block is identical in operation to that shown in Fig. 1 except that the two semicylindrical parts overlap and that the pins are fixed in the latter.

The gimbal bearing provided in the present invention has been tested and is now in use in missiles having large rocket engines where it has been proven to be an ideal, light-weight structure on which the engines can be universally tilted to change the direction of the missiles in flight. It is very successful irrespective of the high thrust produced by the rocket engines.

Although this invention has been described and illustrated in detail, it is to be clearly understood that the same is by way of illustration and example only and is not to be taken by way of limitation, the spirit and scope of this invention being limited only by the terms of the appended claims.

We claim:

1. In a guided missile powered by a rocket motor, means by which said rocket motor can be tilted to change the direction of said missile comprising an integral bearing block having cylindrical bearing surfaces on opposite sides thereof, a motor mount on said missile, a pillow block on said mount having a bearing surface thereon complementary to one of said cylindrical bearing surfaces, a pillow block on said motor having a bearing surface thereon complementary to another of said cylindrical bearing surfaces, means connecting said bearing block to said pillow blocks to prevent separation thereof and to allow universal tilting of said pillow blocks on said motor and said mount, said one of said cylindrical bearing surfaces on said bearing block in direct bearing contact with its complementary bearing surface on said mount pillow block, and said other cylindrical bearing surface on said bearing block in direct bearing contact with its complementary bearing surface on said motor pillow block whereby said motor can be tilted universally with respect to said motor mount.

2. The invention according to claim 1 in which said bearing block has two bearing surfaces having longitudinal axes at 90° to each other.

3. The invention according to claim 2 in which said bearing surfaces on said bearing block are convex and substantially semicylindrical, and in which said bearing surfaces in said pillow blocks are concave.

4. The invention according to claim 3 including actuating means connected to said motor and said missile to tilt said motor with respect to said motor mount.

5. A gimbal bearing assembly comprising a bearing block having a first convex, semicylindrical bearing surface on one side thereof; a second convex, semicylindrical bearing surface on the side opposite said one side of said block; said first and second convex surfaces having longitudinal axes at 90° to each other, a fixed pillow block having a first concave bearing surface fitted in contact with said first convex surface, a tiltable pillow block having a second concave bearing surface fitted in contact with said second convex surface, first pin means disposed longitudinally on said axis of said first convex surface, said first pin means holding said first convex surface in contact with said first concave surface and permitting said first convex surface to move with respect to said first concave surface, second pin means disposed longitudinally on said axis of said second convex surface, said second pin means holding said second convex surface in contact with said second concave surface and permitting said second convex surface to move with respect to said second concave surface whereby said tiltable pillow block can be universally tilted with respect to said fixed pillow block.

6. In a guided missile powered by a rocket motor, means by which said rocket motor can be titled to change the direction of said missile comprising an integral bearing block having cylindrical-shaped bearing surfaces with axis 90° apart and on opposite sides thereof, pillow block means to connect said block to said missile and said motor to prevent separation thereof and to allow universal tilting of said motor with respect to said missile, said pillow block means including bearing surfaces complementary to said shaped bearing surfaces, and pin means extending between said integral bearing block and said pillow block means permitting pivoting of said bearing block with respect to said pillow block means.

7. In a guided missile powered by a rocket motor, means by which said rocket motor can be tilted to change the direction of said missile comprising an integral bearing block having cylindrical-shaped bearing surfaces with axes 90° apart and on opposite sides thereof, a motor mount on said missile, complementary bearing surface means on said mount in direct bearing contact with one of said bearing surfaces on one of said opposite sides, complementary bearing surface means on said motor in direct bearing contact with one of said bearing surfaces on the other of said opposite sides, pivot pin means extending between said bearing block and said mount and said last mentioned bearing surface means on said motor to prevent separation thereof and to allow for universal tilting of said bearing surface means on said motor and said mount.

8. In a guided missile powered by a rocket motor, an integral bearing block consisting of two semi-cylinders having their major axes at right angles, their curved portions being bearing surfaces at opposite sides of the block, and their flat portions in abutment, and means including bearing surfaces complementary to said curved portions to connect said block to said missile and said motor to prevent separation thereof and to allow universal tilting of said motor with respect to said missile.

9. A gimbal bearing assembly comprising an integral cross-shaped bearing block having outer peripheral semi-cylindrical shaped bearing surfaces thereon at right angles to each other on opposite sides of said block and forming crossed legs, pillow block means including bearing surfaces complementary to said shaped bearing surfaces to rotatively connect said bearing block to two members to be gimballed, and pin means extending between the ends of each of said crossed legs and said pillow block means permitting pivoting of said bearing block with respect to said pillow block means.

References Cited in the file of this patent
UNITED STATES PATENTS

| | | |
|---|---|---|
| 1,143,659 | Stern | June 22, 1915 |
| 1,180,468 | Bartlett | Apr. 25, 1916 |
| 1,249,545 | Sponsel | Dec. 11, 1917 |
| 1,581,802 | Holmes | Apr. 20, 1926 |
| 1,625,511 | Ungerer | Apr. 19, 1927 |
| 1,650,557 | Weingartner | Nov. 22, 1927 |
| 1,952,425 | Eckner | Mar. 27, 1934 |
| 1,996,688 | Porsche | Apr. 2, 1935 |
| 2,621,871 | Robert | Dec. 16, 1952 |
| 2,672,740 | Dunn | Mar. 23, 1954 |